(12) United States Patent
Klein et al.

(10) Patent No.: US 6,266,698 B1
(45) Date of Patent: Jul. 24, 2001

(54) LOGGING OF TRANSACTION BRANCH INFORMATION FOR IMPLEMENTING PRESUMED NOTHING AND OTHER PROTOCOLS

(75) Inventors: Johannes Klein, San Francisco; Albert C. Gondi, Santa Clara; Sitaram V. Lanka, Mountain View; William J. Carley, San Jose, all of CA (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/127,658

(22) Filed: Jul. 31, 1998

(51) Int. Cl.[7] ..................................................... G06F 15/16
(52) U.S. Cl. ......................... 709/227; 709/230; 709/101
(58) Field of Search ..................................... 709/101, 227, 709/230, 232, 223

(56) References Cited

U.S. PATENT DOCUMENTS 5,428,771 * 6/1995 Daniels et al. ........................ 709/101
5,852,732 * 12/1999 Freund et al. ........................ 709/101
5,924,095 * 7/1999 White .................................... 707/10

* cited by examiner

*Primary Examiner*—Zarni Maung
(74) *Attorney, Agent, or Firm*—Anthony B. Diepenbrock; Leah Sherry; Oppenheimer, Wolff & Donnelly LLP

(57) ABSTRACT

Methods and systems for interoperating a transaction processing system implementing the presumed abort variation of the two-phase commit (2PC) protocol with a system implementing the presumed nothing variation. The gateway process that is responsible for exporting a transaction branch to a foreign transaction management system from a system implementing the presumed abort variation records whether the foreign transaction manager is implementing the presumed abort variation or the presumed nothing variation. After system failure, the gateway process determines which variation is adopted for a specific transaction branch. If the foreign transaction manager is implementing the presumed abort variation, the transaction manager from which the transaction branch originated communicates with the foreign transaction manager through the gateway process in accordance with the presumed abort variation. If the foreign transaction manager is implementing the presumed nothing variation, the gateway process takes charge of driving abort processing in a manner transparent to the originating transaction manager.

11 Claims, 5 Drawing Sheets

FIG. 2 Components of a Heterogeneous Transaction Processing System.

LOGGING OF TRANSACTION BRANCH INFORMATION FOR IMPLEMENTING PRESUMED NOTHING AND OTHER PROTOCOLS

BACKGROUND OF THE INVENTION

The present invention relates generally to transaction processing systems, and more particularly to techniques for supporting transaction commitment processing for a transaction that is distributed between two transaction management systems using different variations of a commitment processing protocol.

A transaction most often is defined as an explicitly delimited operation, or set of related operations, that change or otherwise modify the content of an information collection (e.g., database or databases) from one consistent state to another. Changes are treated as a single unit in that all changes of a transaction are formed and made permanent (the transaction is "committed") or none of the changes are made permanent (the transaction is "aborted"). If a failure occurs during the execution of a transaction, resulting in the transaction being aborted, whatever partial changes were made to the collection are undone to leave it in a consistent state.

A transaction processing system typically includes a transaction manager; a collection of subsystems, called resource managers (RMs), which are essentially abstractions of available services, such as database systems; programming languages; user interfaces; application interfaces; and the like. The transaction processing system provides a way to interconnect applications and resource managers while maintaining data integrity and transactional consistency. In this manner, any number of database systems (e.g., DB2, Oracle, Sybase, etc.), any number of programming languages (e.g., C++, Cobol, Fortran, etc.), any number of networks (e.g., OSI, TCP/IP, etc.), any number of presentation managers (e.g., Windows, DOS, etc.), and any number of application generators (e.g., CSP, Pathmaker, Cadre, etc.) are able to interoperate to complete a transaction.

The application process initiating a transaction invokes various services and/or resource managers to perform various operations and tasks necessary to complete the transaction. All services and resource managers invoked to perform operations for the transaction register with a transaction manager, stating that they are joining the transaction. A transaction manager typically provides transaction management functions, such as monitoring the progress of the transaction and coordinating the commit processing and rollback of the transaction, and protects the integrity of user data. When all operations, or work, have completed, the initiating application process notifies the transaction manager of this fact. The transaction manager then initiates an agreement protocol to coordinate commitment processing among all services and resource managers participating in the transaction. In transaction processing the standard agreement protocol is the two-phase commitment (2PC) protocol. A description of the 2PC protocol, as well as a detailed overview of transaction processing, is presented in J. Gray et al., *Transaction Processing Concepts and Techniques*, Morgan Kauffman, 1993, the contents of which are herein incorporated by reference.

Briefly, in phase one of the 2PC protocol, the transaction manager issues a request prepare signal to each participant (i.e., the transaction manager asks each participating service or resource manager if it believes the operations it performed to be a consistent and complete transformation). If any participant votes no, the commit fails and the transaction is aborted and rolled back; if all participating resource managers vote yes (ready to commit), the transaction is a correct transformation and phase two commences. In phase two of the 2PC protocol, the transaction manager issues a commit request signal informing each participant that the transaction is complete, and records this fact in the transaction's log. After all participants acknowledge the commit request, the transaction manager records this fact and forgets about the transaction.

Two commonly used variations of the 2PC protocol are the presumed abort variation and the presumed nothing variation. Both variations operate identically when there are no failures (e.g., system failure or a connection down at a participant) or when the transaction is not explicitly aborted (e.g., a no vote by any participant).

In the presumed nothing variation of the 2PC protocol, the transaction manager initiates all communications relating to the 2PC protocol, including initiating a recovery process in the event of a failure. Furthermore, when the transaction manager issues a request, such as a prepare request or a commit request or an abort request, the transaction manager must wait for an associated response, such as a prepare ready response or a commit acknowledgment or an abort acknowledgment. In some cases, the presumed nothing variation can be very inefficient. For example, if there is a failure or a no vote and the transaction manager issues an abort request, and if there is a connection down at one of the participants to the transaction, the transaction manager must wait for an abort acknowledgment from that participant. The abort acknowledgment will not be received until at least after the connection is re-established.

In the presumed abort variation of the 2PC protocol, it is not required that the transaction manager initiate all communications relating to the 2PC protocol, or that the transaction manager must wait for a response to a request signal. In particular, both the transaction manager and the participants can initiate a recovery process. For example, in the above example, the transaction manager will clean up and go away without waiting for an abort acknowledgment from any participant, including the participant with the down connection. If, for example, that participant re-establishes a connection at a later time and initiates a recovery process, the transaction manager will check its log record and see that it is not waiting for anything and will assume that the transaction was aborted. It will respond to the querying participant that the transaction has been aborted. In this manner the system performance is not degraded because the transaction manager is not idle (waiting for an abort acknowledgment).

Generally, most transaction processing systems today use the presumed abort variation of the 2PC protocol. However, some systems, including IBM's CICS LU6.2, use the presumed nothing variation of the 2PC protocol. Thus, to support heterogenous transactions with IBM's LU6.2 database, a technique for allowing consistent communications processing, especially after a failure, must be implemented. One way would be to use both protocols in the local transaction management system, one to support the presumed abort variation and one to support the presumed nothing variation. However, this would burden the transaction processing system as it effectively doubles the amount of code needed to be stored and implemented by the transaction manager.

SUMMARY OF THE INVENTION

The present invention provides methods and systems for effectively supporting different variations of a commitment processing protocol in a transaction processing system. In particular, the present invention provides techniques for supporting both the presumed abort and presumed nothing variations of the two-phase commitment (2PC) protocol in a heterogenous transaction processing system.

The techniques of the present invention generally provide an efficient, transparent way to interoperate a system implementing the presumed abort variation of the 2PC protocol with a system implementing the presumed nothing variation. The gateway process that is responsible for exporting a transaction branch to a foreign transaction management system from a system implementing the presumed abort variation records whether the foreign transaction manager is implementing the presumed abort variation or the presumed nothing variation. After a system failure, the gateway process determines which variation is adopted for a specific transaction branch. If the foreign transaction manager is implementing the presumed abort variation, the transaction manager from which the transaction branch originated communicates with the foreign transaction manager through the gateway process according to the presumed abort variation. If the foreign transaction manager is implementing the presumed nothing variation, the gateway process takes charge of driving abort processing in a manner transparent to the originating transaction manager.

According to an aspect of the present invention, a transaction processing system is provided which comprises a first transaction manager (TM), which uses a first variation of a commitment protocol and a communication resource manager (CRM), coupled to the first TM, for communicating with a second TM which uses one of the first variation of the commitment protocol and a second variation of the commitment protocol. When the CRM exports a transaction branch from the first TM to the second TM, the CRM generates a log file indicating which of the two variations of the commitment protocol the second TM is using. The system also includes a storage unit, coupled to the CRM, for storing the log file. In preferred aspects, the commitment protocol is the two-phase commitment (2PC) protocol, and the first variation is the presumed abort variation and the second variation is the presumed nothing variation.

According to another aspect of the present invention, a method is provided for supporting a transaction commitment processing session between a first transaction manager (TM) and a second TM in a transaction processing system. The first TM uses a first variation of a commitment protocol, and the second TM uses one of the first variation of the commitment protocol and a second variation of the commitment protocol. The method comprises the steps of: establishing, with a communication resource manager (CRM) coupled to the first TM, a transaction communication session between the first TM and the second TM; generating a log file indicating which of the two variations of the commitment protocol the second TM uses; and storing the log file to a storage unit coupled to the CRM.

Reference to the remaining portions of the specification, including the drawings and claims, will realize other features and advantages of the present invention.

Further features and advantages of the present invention, as well as the structure and operation of various embodiments of the present invention, are described in detail below with respect to the accompanying drawings. In the drawings, like reference numbers indicate identical or functionally similar elements.

DESCRIPTION OF THE SPECIFIC EMBODIMENTS

Figure 1:
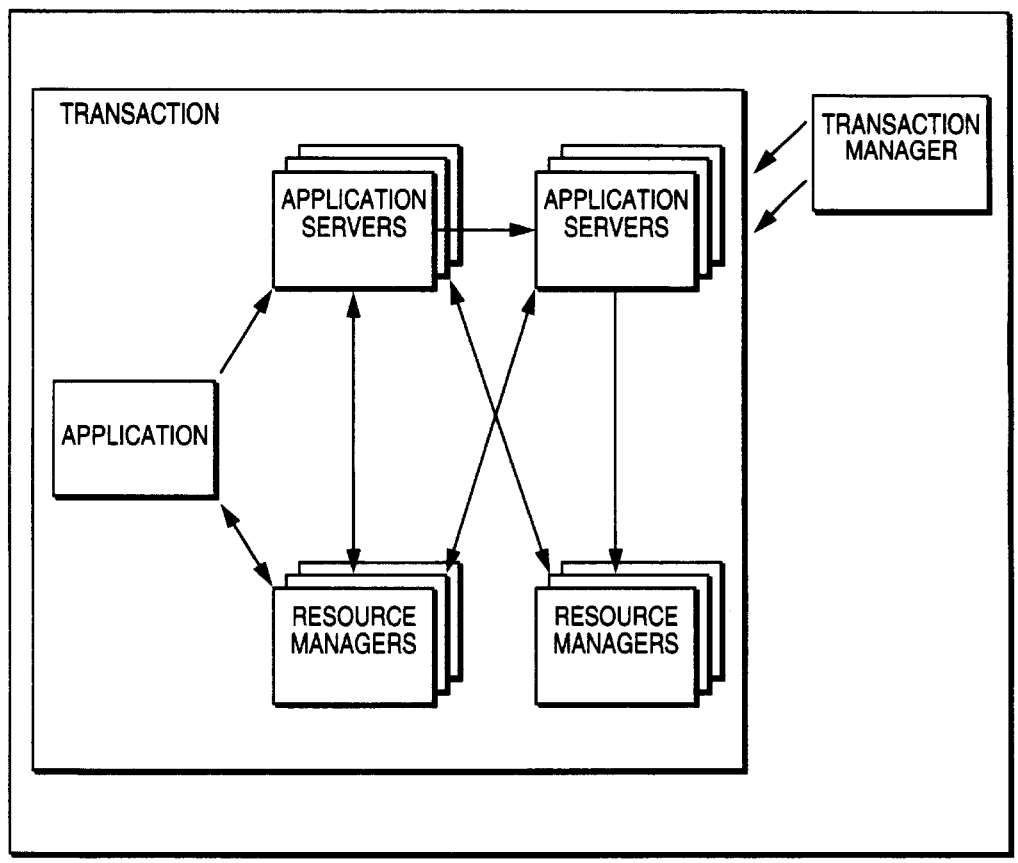
FIG. 1 illustrates a typical call structure of an application invoking various resource managers and application services to execute a transaction that is spread among application programs (clients and servers) and resource managers.

FIG. 1 illustrates a typical call structure of an application process that is invoking various resource managers and application services to execute a transaction that is spread among application programs (clients and servers) and resource managers according to the present invention. Transaction processing occurs in both centralized (local) systems and in distributed systems. The services and resource managers are invoked using local and/or remote procedure calls accordingly. Remote services and servers run in separate processes, such as on a remote computer system, while local services and servers run in the local computer system. In a localized transaction processing system, an application process accesses services by calling one or more local resource managers using a transactional procedure call. In a distributed transaction processing system, an application process accesses both local and remote services by calling one or more local resource managers, and/or one or more remote resource managers located at one or more remote processing nodes, or domains, using a transactional remote procedure call.

When an application process subcontracts part of a transaction to a foreign transaction management system it is commonly referred to as exporting a transaction branch. One or more transaction branches can be exported for a given transaction to one or more foreign transaction management systems. Similarly, a foreign transaction management system can start a transaction and subcontract part of the transaction to the local transaction management system. This is referred to as importing a transaction branch. The originator of a transaction is commonly referred to as the "superior" and the one to which part of the transaction is subcontracted to is commonly referred to as the "subordinate". It is the responsibility of the superior to initiate the agreement protocol governing commitment processing (e.g., 2PC protocol).

Figure 2:
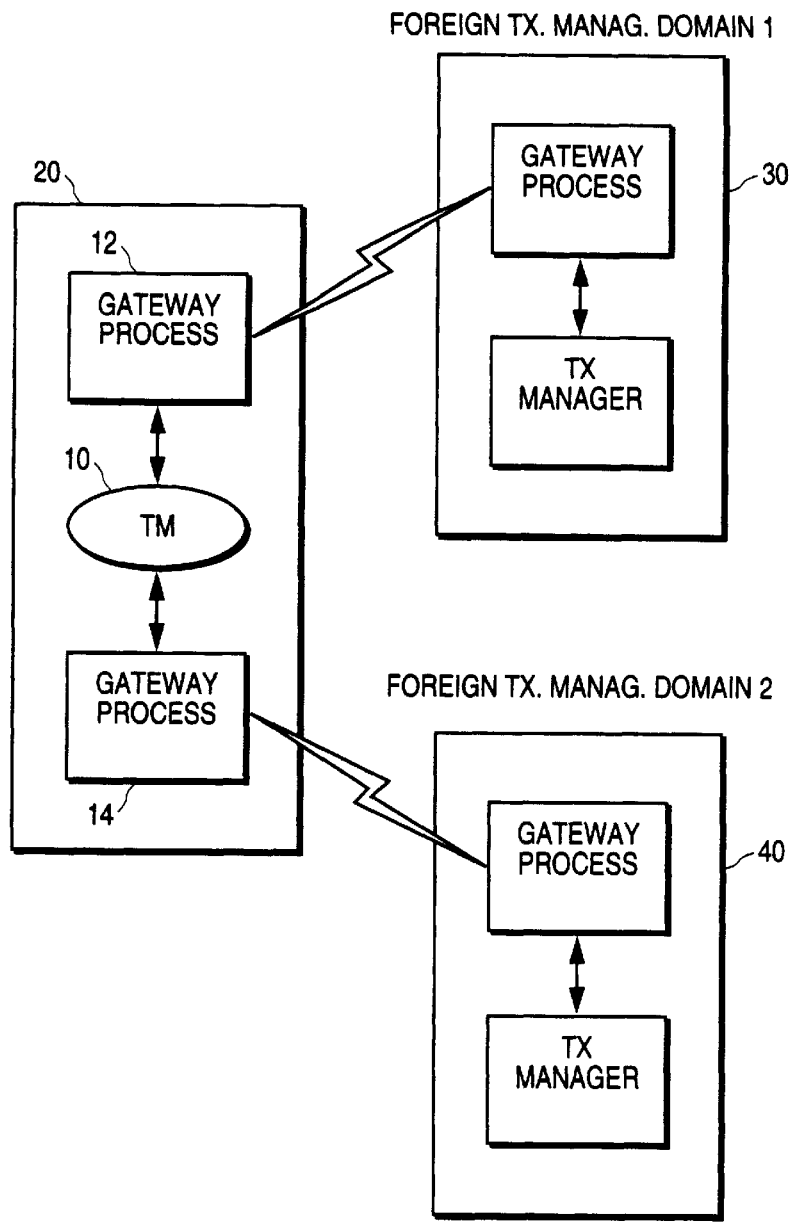
FIG. 2 illustrates the basic components of a heterogeneous transaction processing system according to the present invention.

A typical transaction management system includes an application program, one or more resource managers including a communication resource manager, and a transaction manager. The transaction manager provides transaction management functions, such as monitoring the progress of the transaction and coordinating the commitment processing (or agreement protocol) and rollback of the transaction, and protects the integrity of user data. The application process calls transaction services in the transaction manager to begin and end transactions. As part of a transaction, the application process accesses services by calling one or more local resource managers, and invokes remote services through the communication resource manager. The communication resource manager (CRM) encodes the transactional semantics of a foreign transaction management system and acts as a gateway to foreign transaction management domains. A CRM interfaces between the local transaction manager and a foreign transaction manager. The process environment in which a CRM executes is called a gateway process. The CRM exports and imports transaction branches allowing foreign transaction managers to participate in the agreement protocol with the local transaction manager. FIG. 2 illustrates the basic components of such a heterogeneous transaction processing system according to the present invention. As shown, transaction manager 10 of local transaction management domain 20 imports and exports transactions to and from foreign transaction management domains 30 and 40 through gateway processes 12 and 14, respectively, in the communication resource manager (not shown).

Figure 3:
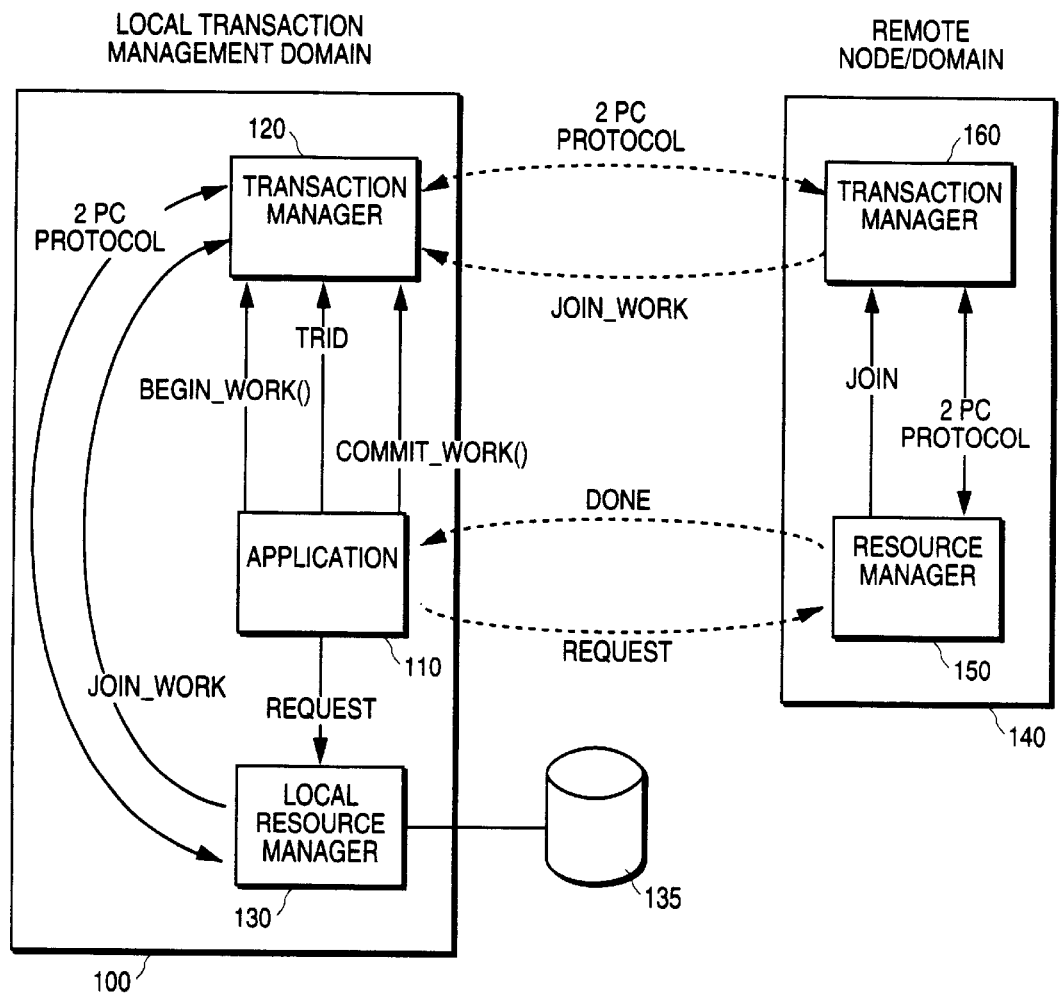
FIG. 3 illustrates the basic control flow of an application executing a transaction according to the present invention.

FIG. 3 illustrates the basic control flow of an application executing a transaction according to the present invention. When the application process 110 starts a transaction in local transaction management domain 100, it issues a Begin_Work( ) request to its associated local transaction manager 120, thereby registering the transaction with transaction manager 120. Transaction manager 120 creates a unique transaction identifier (TRID), which is used to identify that particular transaction. Once application process 110 has started the transaction (the transaction has been registered with transaction manager 120), it invokes resource managers by sending work requests to local and remote (foreign) services. Application process 110 interacts with a gateway process (not shown) to export a transaction branch to a foreign transaction management system 140. The gateway process informs transaction manager 120 of the exported transaction branch. In this manner, for each transaction started with transaction manager 120, one or more transaction branches can be exported to various foreign transaction management systems. Each exported transaction branch is given a unique transaction handle.

When a resource manager receives the first work request associated with a transaction, it joins the transaction by communicating to its local transaction manager that it wants to participate in the transaction's commitment processing (agreement protocol, e.g., 2PC protocol) and rollback operations. For example, if a request is sent to local resource manager 130, which is coupled to a service or resource 135 such as a database, local resource manager 130 registers with transaction manager 120 that it is joining the transaction; if a request is sent to remote resource manager 150, which is coupled to another resource or service, remote resource manager 150 registers with its local transaction manager 160 that it is joining the transaction. In the latter case, remote transaction manager 160 communicates (via a gateway process in each domain) with transaction manager 120 stating that it wishes to participate in the transaction's commitment processing and rollback operations on behalf of remote resource manager 150. Given a resource manager name, or ID, registering a resource manager involves creating a control block for the resource manager and inserting it on the list of control blocks. In this case, transaction manager 120 is the "superior" and the remote transaction manager is a "subordinate."

It is typical for several resource managers to join a particular transaction. As each resource manager performs work for the transaction, it keeps a list of the changes it has made to any objects. As a rule, the old and new value of an object is recorded to a transaction log. If the transaction should fail during execution or if the transaction is aborted, transaction manager 120 orchestrates a transaction rollback. In this case, transaction manager 120 invokes each resource manager that wrote to the transaction log to undo the operation, thereby reinstating the old value of each object transformed during execution of the failed transaction.

When all work has been completed for the initiating application process by the resource managers performing work for the transaction, a Commit_Work( ) request is issued to transaction manager 120. In response, transaction manager 120 initiates the commitment processing. In preferred aspects, the two-phase commit (2PC) protocol is used for executing the commitment processing. First, transaction manager 120 communicates with all participating resource managers that joined the transaction (including any participating remote resource managers such as remote transaction manager 160), asking if each participating resource manager believes the transaction to be a complete and consistent transformation. If any participating resource manager votes no, the commit fails and the transaction is rolled back; if all participating resource managers vote yes, the transaction is a correct transformation. In the latter case, transaction manager 120 informs each participating resource manager that the transaction is complete, and records this fact in the transaction log.

Figure 4:
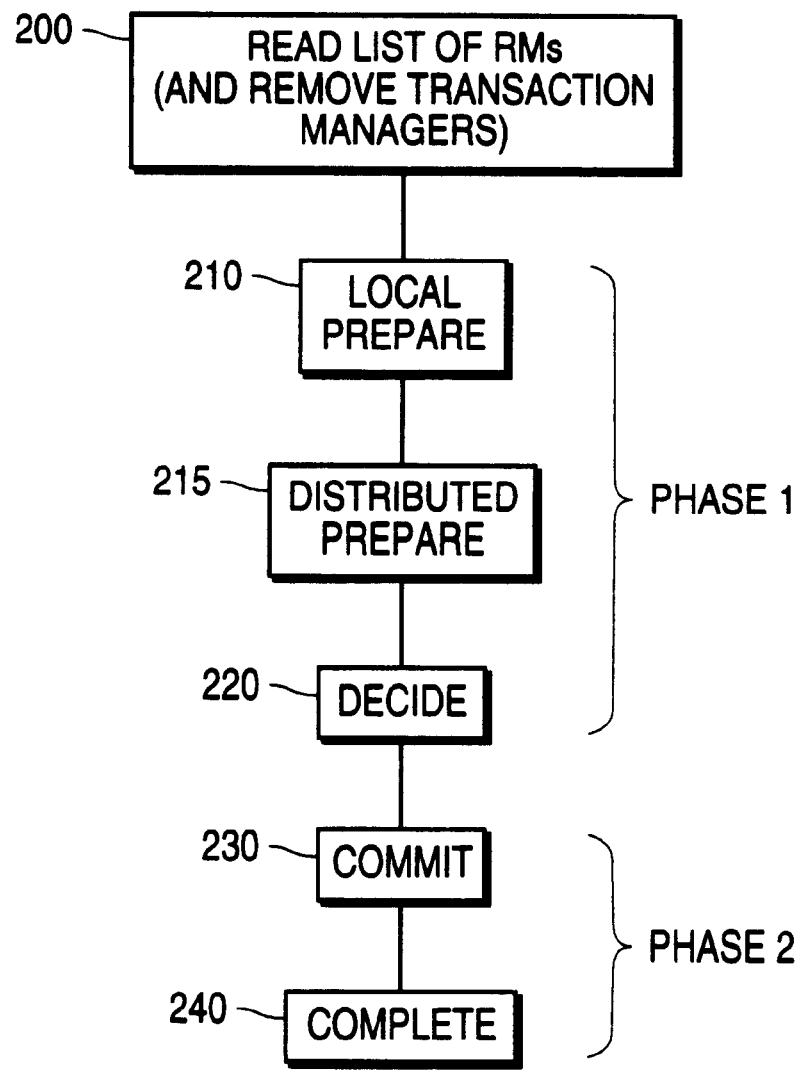
FIG. 4 illustrates the steps of the two-phase commit (2PC) protocol executed by a transaction manager when a successful Commit Work() request is invoked on a transaction.

FIG. 4 illustrates the steps of the 2PC protocol executed by transaction manager 120 when a successful Commit_Work( ) is invoked on a transaction. At step 200, transaction manager 120 accesses a list, e.g., the resource manager control block list, which includes information about all participating local resource managers and transaction branches (foreign or remote transaction managers who expect a phase one prepare message) that have joined the transaction. At local prepare step 210, transaction manager 120 sends a prepare request signal to each participating local resource manager to prepare for commit. That is, transaction manager 120 asks if each local resource manager believes the transaction to be a complete and consistent transformation. At distributed prepare step 215, transaction manager 120 sends a prepare request signal on each outgoing transaction branch (a gateway process that has exported a transaction branch). That is, a prepare request is sent to each foreign transaction manager. Each foreign transaction manager is responsible for executing the 2PC protocol with any of its resource managers, and any outgoing transaction branches, that may have joined the transaction. Steps 210 and 215 may be performed separately or simultaneously as desired for optimal system performance.

At decide step 220, if any of the participating local resource managers or any of the outgoing transaction branches respond no, the transaction is aborted and rolled back. If all participating local resource managers vote yes and all outgoing transaction branches respond yes, then the transaction writes a commit log record. When the record is durably written to disk, the transaction is logically committed. If the system fails prior to this point, the commit will have failed; if the system fails subsequent to this point, the commit step will be carried forward by restart logic. At commit step 230, transaction manager 120 sends a commit decision (i.e., a commit request signal) on each of the transaction branches and to each participating local resource manager. At complete step 240, when all participating local resource managers and all outgoing transaction branches have acknowledged the commit decision, a completion record (or forget log record) is written to the log indicating that phase two completed, and transaction manager 120 forgets about the transaction.

In the typical presumed nothing variation of the 2PC protocol, the superior writes an audit record before sending the request prepare signal to its subordinates. A subordinate has to acknowledge abort as well as commit messages from the superior. A transaction is forgotten by the superior after having received an acknowledgment for committing or aborting the transaction from all of the subordinates. After a crash, the superior knows about all transaction branches for which the request prepare signal has been sent (some of which could be in the "in-doubt" state). The superior initiates the resolution of all transactions for which a request prepare signal has been sent. A subordinate does not need to take any special action after a failure as it is the responsibility of the superior. After a failure, if a commit record exists then the superior decides to commit the transaction and inform all subordinates of that decision. The existence of an abort record, or the absence of an abort or a commit record, will mean that the superior will abort the transaction and convey this decision to all of the subordinates.

In the typical presumed abort variation of the 2PC protocol, an abort signal is always acknowledged in the absence of a failure (communication failure or node failure). A commit signal is always acknowledged. Therefore, in the absence of a failure, a superior can only forget a transaction when it has received acknowledgment for either a commit or abort of the transaction; a subordinate can forget about a transaction when it has either received an acknowledgment for an abort or has received a commit signal. In the event of a failure, an aborted transaction is forgotten without waiting for an acknowledgment either from a subordinate or the superior. However, a subordinate does acknowledge a commit signal received from the superior. Upon coming back from a failure, it is the responsibility of each subordinate to initiate a dialogue with the superior to determine the outcome of all unresolved transactions. Whenever the superior receives an inquiry for a transaction that it has no record of, it assumes that the transaction is indeed aborted, and sends back an abort message. Whenever a subordinate receives a commit signal from the superior and it has no record of the transaction, it assumes that the transaction is committed and acknowledges the commit.

In a preferred embodiment of the present invention, the transaction manager treats every transaction branch as if it were presumed abort. It is at the gateway process that the following changes are implemented according to the present embodiment to interoperate with a system using the presumed nothing variation. When exporting or importing a transaction branch, the transaction manager is told that the transaction branch has opted for the presumed abort variation (i.e., the foreign transaction manager). It is only at the gateway process that it is recorded if the presumed nothing variation is adopted for that transaction branch. That the transaction branch uses the presumed nothing variation is, however, transparent to the transaction manager of the exporting system.

Figure 5:
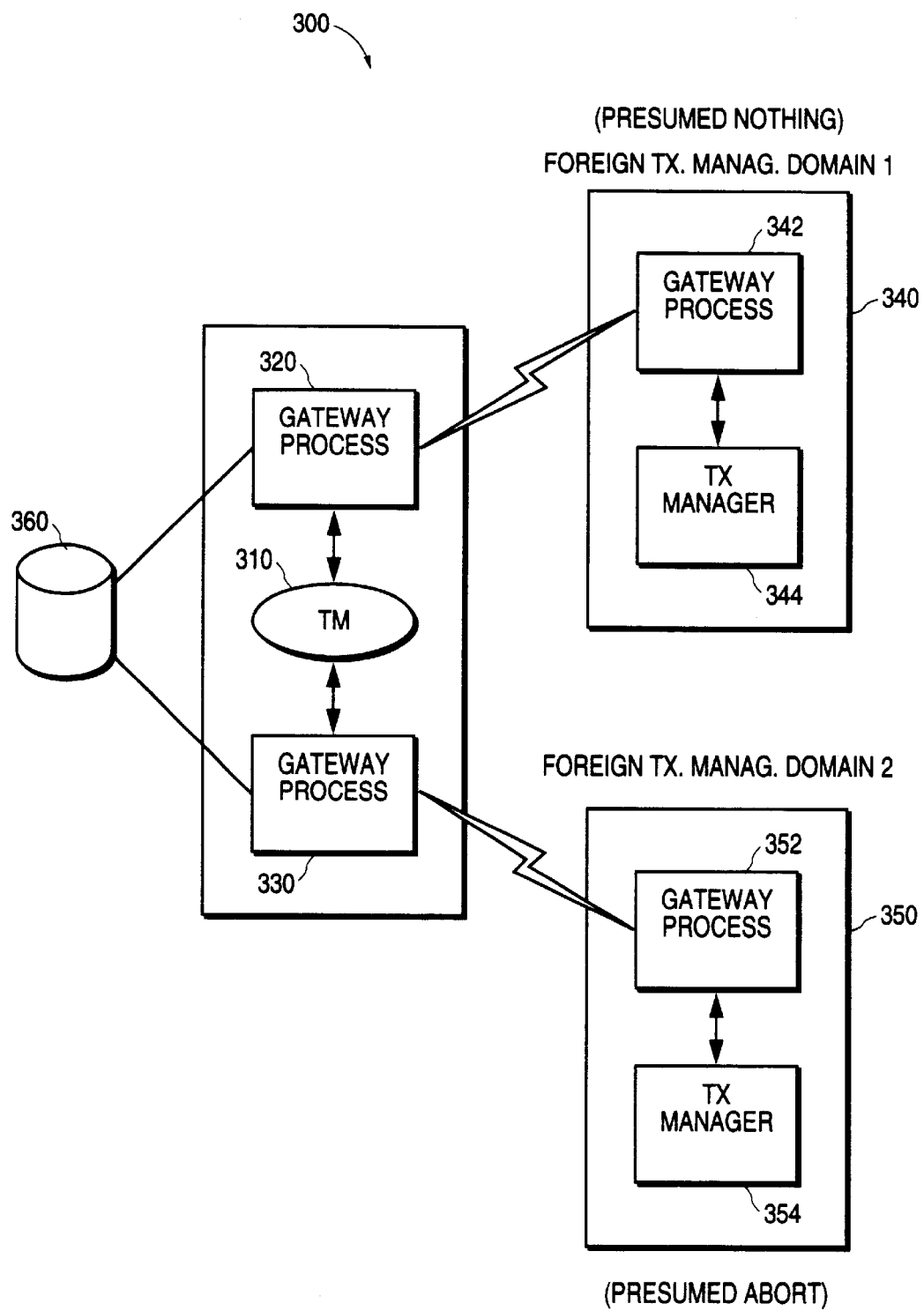
FIG. 5 illustrates the components of an example of a heterogenous transaction processing system according to an embodiment of the present invention.

FIG. 5 illustrates the components of an example of a heterogenous transaction processing system 300 according to an embodiment of the present invention. Transaction manager 310 exports transaction branches to foreign transaction domains 340 and 350 via gateway processes 320 and 330, respectively. Transaction manager 344 of foreign transaction domain 340 communicates with gateway process 320 through gateway process 342. Similarly, transaction manager 354 of transaction domain 350 communicates with gateway process 330 through gateway process 352. It is also possible (not shown) that gateway process 320 communicates with both transaction domains 340 and 350 through gateway processes 342 and 352, respectively. Disk 360, according to one embodiment, is coupled to both gateway processes 320 and 330 and is provided for storing data, including data pertaining to communications with foreign transaction domains. In preferred aspects, the data stored to disk 360 includes data indicating whether a specific transaction domain is implementing the presumed abort or the presumed nothing variation of the 2PC protocol.

In FIG. 5, transaction manager 310 implements the presumed abort variation of the 2PC protocol, as does transaction manager 354 of transaction domain 350. However, transaction manager 344 of transaction management domain 340 implements the presumed nothing variation of the 2PC protocol. When exporting a transaction branch to foreign transaction domain 340, gateway process 320 records to disk 360 that the transaction branch exported to foreign transaction domain 340 has opted for the presumed nothing variation (i.e., transaction manager 344 implements the presumed nothing variation).

According to one embodiment, during normal processing gateway process 320 retains information on all presumed nothing transaction branches until acknowledgments for abort and commit signals have been received. Preferably, each presumed nothing exported transaction branch is recorded on disk 360. According to one embodiment, this is achieved by writing to a file on disk 360 (this is not the audit trail). The write is no-waited. Preferably, a single bit is stored that indicates which variation of the 2PC protocol is being implemented for a particular transaction branch. Other information relating to the transaction branch is also stored to disk 360, such as information about how to interconnect after a system failure. According to one embodiment, a requirement is that this write be completed before the gateway process 320 forwards the request prepare signal to foreign transaction manager 344. All presumed nothing exported transaction branches for a transaction will typically fit on a single 4K record. For example, in the case where foreign transaction domain 340 represents a CICS LU6.2 system, the number of possible branches is bound by the number of sessions established between two LUs. The number of sessions are usually between 10 to 20 for typical configurations, and an LUWID which is 4 bytes long is recorded for each presumed nothing transaction branch.

When gateway process 320 receives a Forget signal (abort acknowledgment) for this transaction branch from the foreign transaction manager 340, it first records this on disk 360 before forwarding the Forget signal to the transaction manager 310. The effect of recording the Forget signal on disk 360 is to remove this transaction from the list of presumed nothing exported transaction branches that is maintained. This write is no-waited.

When foreign transaction manager 344 unilaterally aborts the presumed nothing exported transaction branch, gateway process 320 receives and forwards the rollback request to transaction manager 310, fabricates an acknowledgment for the rollback request to foreign transaction manager 344, and records on disk 360 that the transaction branch is forgotten. (Recall, transaction manager 310 is still assuming that this is a presumed abort transaction branch. As a result, transaction manager 310 will not send an acknowledgment to a rollback request signal to gateway process 320.) The effect of recording the Forget signal on disk 360 is to remove this transaction from the list of presumed nothing exported transaction branches that is maintained. This write is no-waited.

When local transaction manager 310 unilaterally aborts the presumed nothing exported transaction branch, gateway process 320 sends the rollback request (abort) to foreign transaction manager 344. When foreign transaction manager 344 acknowledges the abort, it is recorded on disk 360 that the transaction branch is forgotten. The effect of recording the Forget signal on disk 360 is to remove this transaction from the list of presumed nothing exported transaction branches that is maintained. This write is no-waited.

According to one embodiment, during crash recovery transaction manager 310 sends the list of all unresolved transaction branches (prepared or committed) to gateway process 320. Gateway process 320 resends the signals for the unresolved transaction branches to foreign transaction manager 344. Gateway process 320 also drives the abort of all of the presumed nothing exported transaction branches that are recorded by it but that are not prepared or committed. Gateway process 320 sends the rollback request signal for these transaction branches to foreign transaction manager 344 but nothing to local transaction manager 310. Once it receives a Forget signal from foreign transaction manager 344 it forgets about this transaction, i.e., a no-waited write to the file (e.g. disk 360) where it maintains the list of presumed nothing exported transactions. The effect of this write is to remove the transaction from the list.

No action is taken for a presumed nothing imported transaction branch. That is, there is no need to record the presumed nothing imported transaction branch on disk 360. When foreign transaction manager 344 unilaterally aborts the presumed nothing imported transaction branch, gateway process 320 receives and forwards the rollback request to local transaction manager 310, and fabricates an acknowledgment for the rollback request to foreign transaction manager 344. When local transaction manager 344 unilaterally aborts the presumed nothing imported transaction branch, gateway process 320 forwards the rollback request signal to foreign transaction manager 344. When foreign transaction manager 344 acknowledges the rollback request then the transaction is forgotten by gateway process 320.

According to one embodiment, during crash recovery, among other things, transaction manager 310 sends the list of all unresolved presumed nothing imported transaction branches (prepared) to gateway process 320. However, gateway process 320 does not take any action as it is a subordinate. Its superior (i.e., foreign transaction manager 344) will initiate the signals to drive the transaction branches to completion.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A transaction processing system comprising:
  a) a first transaction manager (TM), wherein the first TM uses a first variation of a commitment protocol;
  b) a first resource manager that communicates with the first transaction manager to join in a transaction managed by the first transaction manager;
  c) a second transaction manager (TM), wherein the second TM uses one of the first variation of the commitment protocol and a second variation of the commitment protocol;
  d) a second resource manager, that communicates with the second transaction manager to join in a transaction managed by the second transaction manager;
  e) a communication resource manager (CRM), interfacing between the first TM and the second TM, wherein, when the CRM exports a transaction branch from the first TM to the second TM, the CRM generates a log file indicating which of the two variations of the commitment protocol the second TM is using; and
  f) a storage unit, coupled to the CRM, for storing the log file.

2. The system of claim 1, wherein the commitment protocol is the two-phase commitment (2PC) protocol, and wherein the first variation of the 2PC protocol is a presumed abort variation and the second variation of the 2PC protocol is a presumed nothing variation.

3. The system of claim 2, wherein during recovery of a system failure, if the second TM is using the presumed nothing variation, the CRM establishes an abort processing session with the second TM.

4. The system of claim 1, wherein the log file includes a single bit that indicates which of the two variations of the commitment protocol the second TM uses.

5. A method of supporting a transaction commitment processing session in a transaction processing system in which a communication session manager interfaces between a first transaction manager (first TM) and a second transaction manager (second TM), wherein the first TM uses a first variation of a commitment protocol and wherein the second TM uses one of a first variation of the commitment protocol and a second variation of the commitment protocol, the method comprising the steps of:
  a) communicating with the first TM that a first resource manager is joining a transaction managed by the first TM;
  b) communicating with the second TM that a second resource manager is joining a transaction managed by the second TM;
  c) establishing, with the communication resource manager (CRM) coupled to the first TM, a transaction communication session between the first TM and the second TM;
  d) generating a log file indicating which of the two variations of the commitment protocol the second TM uses; and
  e) storing the log file to a storage unit coupled to the CRM.

6. The method of claim 5, wherein the commitment protocol is the two-phase commitment (2PC) protocol, and wherein the first variation of the 2PC protocol is a presumed abort variation and the second variation of the 2PC protocol is a presumed nothing variation.

7. The method of claim 6, wherein during recovery of a system failure if the second TM is using the presumed nothing variation, the method further includes the step of: establishing, solely by the CRM, an abort processing session with the second TM.

8. The method of claim 7, wherein the step of establishing an abort processing session includes sending a signal requesting rollback of the transaction communication session to the second TM.

9. The method of claim 5, wherein the step of establishing a transaction communication session includes the step of exporting a transaction branch to the second TM.

10. The method of claim 5, wherein the step of generating the log file includes the step of generating a single bit that indicates which of the two variations of the commitment protocol the second TM uses.

11. The method of claim 5, wherein the CRM generates the log file and stores it to the storage unit.

* * * * *